(12) United States Patent
Sall

(10) Patent No.: US 10,171,520 B2
(45) Date of Patent: *Jan. 1, 2019

(54) SEAMLESSLY CONFERENCING A PREVIOUSLY-CONNECTED TELEPHONE CALL

(71) Applicant: International Business Machines Corporation, Armonk, NY (US)

(72) Inventor: Bouna Sall, Bowie, MD (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 95 days.

This patent is subject to a terminal disclaimer.

(21) Appl. No.: 15/168,060

(22) Filed: May 29, 2016

(65) Prior Publication Data

US 2016/0277582 A1 Sep. 22, 2016

Related U.S. Application Data

(63) Continuation of application No. 12/886,191, filed on Sep. 20, 2010.

(51) Int. Cl.
*H04M 3/56* (2006.01)
*H04L 29/06* (2006.01)
(Continued)

(52) U.S. Cl.
CPC ...... *H04L 65/1093* (2013.01); *H04L 12/1822* (2013.01); *H04L 65/1006* (2013.01); *H04L 65/1069* (2013.01); *H04L 65/403* (2013.01); *H04L 65/4015* (2013.01); *H04M 3/56* (2013.01); *H04M 3/563* (2013.01); *H04W 4/06* (2013.01); *H04M 3/38* (2013.01);
(Continued)

(58) Field of Classification Search
CPC ............... H04L 65/403; H04L 12/1818; H04L 65/1069; H04L 12/1822; H04M 3/567; H04M 3/56; H04M 2203/5045
USPC ....................................... 379/202.01, 204.01
See application file for complete search history.

(56) References Cited

U.S. PATENT DOCUMENTS 5,563,882 A 10/1996 Bruno et al.
5,625,407 A 4/1997 Biggs et al.
(Continued)

OTHER PUBLICATIONS

Ek, Gayne et al., "Teleconferencing new tricks for an old tool"; Telephone Engineer and Management, vol. 92, No. 6, pp. 45-46, 50; 1988; Country of Publication: USA; Database: INSPEC; ISSN.: 0040-263X.

(Continued)

*Primary Examiner* — Quynh Nguyen
*Assistant Examiner* — Jirapon Intavong
(74) *Attorney, Agent, or Firm* — Marcia L. Doubet

(57) ABSTRACT

An already-connected telephone call is conferenced in a seamless manner that is transparent to the call participants, after which one or more additional participants may join the conference. The existing call is preferably moved to a conference bridge responsive to an existing call participant either logging on to a network-accessible user interface (such as a web page or portal-type page) or entering some special key or key combination using the participant's phone (which may be a software application that provides phone-like services). The participant requesting the move may be authenticated, and the authorization of the participant to request the move may be verified, before moving the call.

10 Claims, 5 Drawing Sheets

(51) Int. Cl.
*H04L 12/18* (2006.01)
*H04W 4/06* (2009.01)
*H04M 3/38* (2006.01)

(52) U.S. Cl.
CPC .............. *H04M 2203/5009* (2013.01); *H04M 2203/5018* (2013.01)

(56) References Cited

U.S. PATENT DOCUMENTS

| | | |
|---|---|---|
| 5,631,904 A | 5/1997 | Fitser et al. |
| 6,018,360 A | 1/2000 | Stewart et al. |
| 6,236,644 B1 | 5/2001 | Shuman et al. |
| 7,003,086 B1 | 2/2006 | Shaffer et al. |
| 7,233,580 B2 | 6/2007 | Moss et al. |
| 8,458,253 B1 | 6/2013 | Sojka et al. |
| 2003/0145054 A1 | 7/2003 | Van Dyke |
| 2005/0078612 A1 | 4/2005 | Lang |
| 2006/0203831 A1 | 9/2006 | Yoshizawa et al. |
| 2008/0037748 A1 | 2/2008 | Jefferson et al. |
| 2008/0037751 A1 | 2/2008 | Aldrey et al. |
| 2008/0089344 A1 | 4/2008 | Jansson et al. |
| 2008/0120371 A1 | 5/2008 | Gopal |
| 2008/0120381 A1 | 5/2008 | Awan et al. |
| 2008/0152113 A1 | 6/2008 | Chang et al. |
| 2008/0159511 A1 | 7/2008 | Kechane et al. |
| 2008/0304646 A1 | 12/2008 | Nguyen et al. |
| 2009/0077191 A1 | 3/2009 | Bristow et al. |
| 2010/0131866 A1 | 5/2010 | Nielsen et al. |
| 2012/0069983 A1 | 3/2012 | Sall |
| 2012/0163241 A1 | 6/2012 | Sall |

OTHER PUBLICATIONS

Rosenberg, J. et al., "SIP: Session Initiation Protocol", RFC 3261, Internet Engineering Task Force, 2002, printed from http://www.ietf.org/rfc/rfc3261.txt on Sep. 20, 2010, 252 pages.
Buona Sall, U.S. Appl. No. 12/886,191, filed Sep. 20, 2010, Office Action, dated Jul. 20, 2012, 8 pages.
Buona Sall, U.S. Appl. No. 13/411,591, filed Mar. 4, 2012, Office Action, dated Aug. 2, 2012, 13 pages.
Buona Sall, U.S. Appl. No. 12/886,191, filed Sep. 20, 2010, Office Action, dated Jan. 18, 2013, 13 pages.
Buona Sall, U.S. Appl. No. 13/411,591, filed Mar. 4, 2012, Office Action, dated Feb. 5, 2013, 13 pages.
Buona Sall, U.S. Appl. No. 13/411,591, filed Mar. 4, 2012, Office Action, dated May 9, 2014, 22 pages.
Buona Sall, U.S. Appl. No. 12/886,191, filed Sep. 20, 2010, Office Action, dated May 8, 2014, 22 pages.
Buona Sall, U.S. Appl. No. 13/411,591, filed Mar. 4, 2012, Office Action, dated Dec. 4, 2014, 22 pages.
Buona Sall, U.S. Appl. No. 12/886,191, filed Sep. 20, 2010, Office Action, dated Dec. 3, 2014, 22 pages.
Buona Sall, U.S. Appl. No. 13/411,591, filed Mar. 4, 2012, Office Action, dated May 15, 2015, 21 pages.
Buona Sall, U.S. Appl. No. 12/886,191, filed Sep. 20, 2010, Office Action, dated May 15, 2015, 19 pages.
Buona Sall, U.S. Appl. No. 12/886,191, filed Sep. 20, 2010, Office Action, dated Oct. 8, 2015, 24 pages.
Buona Sall, U.S. Appl. No. 13/411,591, filed Mar. 4, 2012, Office Action, dated Nov. 3, 2015, 28 pages.

FIG. 3

320 Active Sessions

| 321 Session Number | 322 Application Session ID | 323 Calling Party | 324 Conference Session ID |
|---|---|---|---|
| 1 | app1.1234567890_12345 | 555-555-0001 | app3.0987654321_32145 |
| 2 | app2.1543216789_98876 | 555-555-0002 | app3.0987654321_32145 |
| 3 | | | |
| . | | | |
| n | | | |

330 →  (row 1)
331 →  (row 2)

340 Conferences

| 341 Conf Number | 342 Conference Session ID | 343 Conference Participants |
|---|---|---|
| 9 | app3.0987654321_32145 | app1.1234567890_12345 |
| | | app2.1543216789_98876 |
| | | |
| | | |

350 →

300 Active Calls

| 301 Call Index | 302 Calling Party | 303 Called Party |
|---|---|---|
| 1 | 555-555-0001 | 555-555-0002 |
| 2 | | |
| 3 | | |
| . | | |
| n | | |

310 →

US 10,171,520 B2

SEAMLESSLY CONFERENCING A PREVIOUSLY-CONNECTED TELEPHONE CALL

BACKGROUND

The present invention relates to telephone conference calls, and deals more particularly with conferencing an already-connected telephone call in a seamless manner that is transparent to the call participants.

When two people are participating in a telephone call, they may decide that it would be useful if one or more other persons were also participating. For example, the current call participants may be work colleagues who are discussing an urgent problem, and they might decide that one or more of their co-workers could provide valuable insight into the problem. Currently, the existing telephone call has to be terminated, and a new telephone call has to be initiated using a conference bridge.

BRIEF SUMMARY

The present invention is directed to seamlessly conferencing a telephone call. In one aspect, this comprises: establishing a telephone call connecting a first party and a second party, comprising creating a first session for the first party and a second session for the second party, the telephone call being a 2-party telephone call that is distinct from a conference call; storing, for the telephone call, first session information describing the first session and second session information describing the second session; receiving, while the telephone call continues to connect the first party and the second party, a request from the first party to create a conference call for adding a third party in communication with the first party and the second party; determining, responsive to the receiving, that an active call record exists in which a calling party phone number stored therein and a called party phone number stored therein match phone numbers associated with the sessions, and thus concluding that the first party is already connected to the second party in the existing connected telephone call; and non-disruptively establishing the requested conference call, by the server, using the stored first and second session information, by moving the existing connected telephone call to a media server that provides the requested conference call without terminating the existing connected telephone call and without requiring acceptance of the conference call by the first party or the second party. The non-disruptively establishing may further comprise: establishing a conference session for the requested conference call; establishing the requested conference call on the media server; requesting the first session and the second session to join the established conference call; responsive to receiving the request to join the established conference call, sending invitation messages for the first session and for the second session to join the conference session, thereby causing the first session and the second session to join the conference call; responsive to the joining, automatically sending, by the server for the respective first session and second session, re-invitation messages to a first user agent used by the first party for the existing connected telephone call and a second user agent used by the second party for the existing connected telephone call, the re-invitation messages containing information that enables the first user agent and the second user agent to connect to the conference call at the media server, thereby automatically causing the first party and the second party to join as participants in the conference call without requiring action by the first party or the second party; and initiating a telephone call to a phone number of the third party, and upon detecting that the third party answers the initiated telephone call, automatically joining a third session to the conference session for the third party to participate in the conference call and automatically connecting a third user agent, used by the third party to answer the initiated telephone call, to the conference call. The sessions may be Session Initiation Protocol ("SIP") sessions, in which case the invitation messages may be SIP INVITE messages and the re-invitation messages may be SIP reINVITE messages.

Embodiments of these and other aspects of the present invention may be provided as methods, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

BRIEF DESCRIPTION OF THE SEVERAL VIEWS OF THE DRAWINGS

The present invention will be described with reference to the following drawings, in which like reference numbers denote the same element throughout.

FIG. 3 illustrates sample data structures which may be used for storing information used by an embodiment of the present invention;

DETAILED DESCRIPTION

When two people are participating in a telephone call using known techniques and decide, during the phone call, that they would like to include one or more other participants, the existing call has to be terminated so that a new call can be established using a conference bridge that will support more than two connections. Terminating the existing call and establishing a new one for restarting the now-ended conversation by calling into a conference bridge is inconvenient.

An embodiment of the present invention is directed toward seamlessly conferencing the already-connected call. That is, the existing call is seamlessly moved to a conference bridge, in a nondisruptive manner—that is, without terminating the existing call and without requiring the call participants to establish a new call. Additional participants can then call in to the conference bridge and join the conference that is already in progress. This approach is much less disruptive to the original call participants. (The additional participants need not be aware that the conference call was originally a call between only two parties.)

According to an embodiment of the present invention, the call is moved to the conference bridge responsive to an existing call participant either logging on to a network-accessible user interface (such as a web page or portal-type page) or entering some special key or key combination using the participant's phone. (The authorization of the requesting participant may also be verified.) This signals the underlying phone system which is supporting the existing phone call to perform the moving of the existing call. Preferably, the phone system first performs an authentication of the party who requests the move to the conference bridge, and if this authentication is successful, the phone system dynamically moves the existing phone call to a conference bridge. As a result, the two original call participants are instantly and seamlessly joined into a conference call, without having to dial into a bridge (and without having to terminate their existing call). Notably, the call participants are no longer connected directly to each other after the call is moved, but instead are connected through a conference bridge. Other participants can then join into the phone call by directly dialing into the bridge—and these other participants will detect no difference between this conference call and one that is initially established as a conference call.

Figure 1:
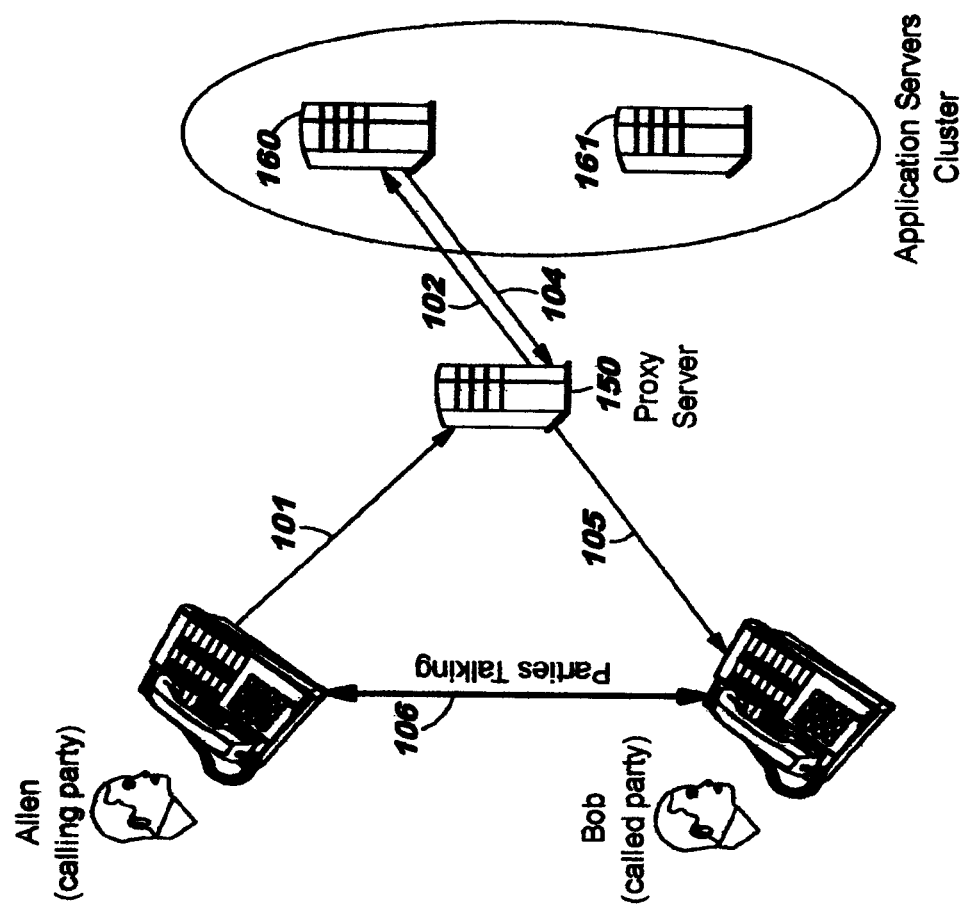
FIG. 1 illustrates an example of establishing a telephone call between two parties, according to the prior art.

FIG. 1 illustrates an example of establishing a telephone call between two parties, according to the prior art. (FIG. 2, discussed below, illustrates how the previously-established call of FIG. 1 may be seamlessly moved to a conference bridge, thereby allowing participation by additional parties, according to an embodiment of the present invention.) The information flow shown in FIG. 1 is described with regard to a known Session Initiation Protocol, which is commonly referred to as "SIP". (SIP is described in Request for Comments (RFC) 3261 from the Internet Engineering Task Force, which is titled "SIP: Session Initiation Protocol". Specific details of existing SIP processing which are not necessary to an understanding of the present invention are omitted herein.)

FIG. 1 illustrates a phone call between a calling party Allen and a called party Bob. Conventional SIP techniques may be used for establishing this phone call, as will now be briefly described. A conventional SIP environment includes a proxy server (see reference number 150) and one or more application servers (see reference numbers 160, 161) which may be organized as an application server cluster. In this example, Allen initiates the call by sending a SIP INVITE request message (see reference number 101) from a user agent executing on his behalf to the proxy server 150. (Note that the user agent for the SIP call participants may be software executing on a computing device. Because this user agent provides calling services, it is also referred to and illustrated herein as a telephone. The term "softphone" is sometimes used when referring to the SIP user agent client which runs on a personal computer or laptop which enables the user's telephone call connection.) According to the SIP protocol, the proxy server 150 is responsible for various call routing functions. The proxy server forwards the SIP INVITE request 101 to application server 160 (see reference number 102). In this example of FIG. 1, the application server 160 forwards 104 the INVITE request to the proxy server 150, which routes it 105 to the user agent representing Bob's telephone. (Note that the application server may directly contact the called party without going through the proxy server, although this has not been illustrated in FIG. 1.) When Bob answers the incoming call, a call is established between Allen and Bob (see reference number 106), and they may then begin talking.

Figure 2:
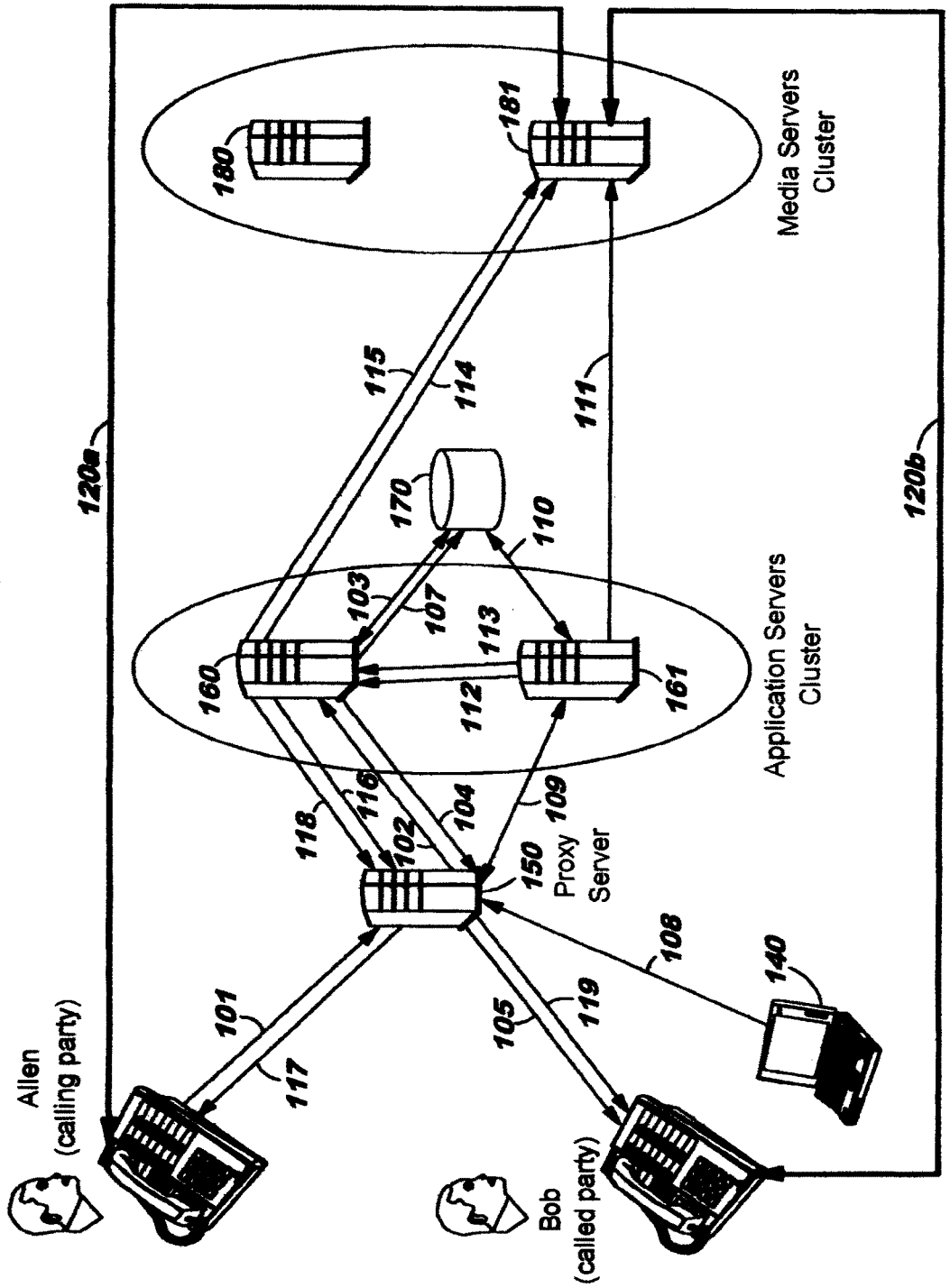
FIG. 2 illustrates how the previously-established telephone call of FIG. 1 may be seamlessly moved to a conference bridge, thereby allowing participation by additional parties, according to an embodiment of the present invention.

Referring now to FIG. 2, the previously-established call of FIG. 1 is seamlessly moved to a conference bridge using techniques disclosed herein, as will now be described. For the telephone call that was established in FIG. 1, application server 160 according to the present invention updates the database 170 with further details regarding the SIP application sessions of the calling and called parties (see reference numbers 103, 107). This information is discussed in more detail below, with reference to FIG. 3. At some point during the established call, Allen and Bob decide that they would like to conference one or more other participants into their call. One of the parties therefore sends a signal, through the proxy server, to request the move to the conference bridge. The move request may be signaled responsive to the requesting party pressing a key or key sequence on the party's telephone, or by logging on to a web-accessible application where an activation indicator (such as a graphical button) is provided through a user interface, and so forth. By way of illustration, in the example shown in FIG. 2, Bob is the person who signals the move request to the proxy server (see reference number 108), and this comprises Bob logging onto a web-accessible application using a laptop 140 (or other appropriate device, equivalently). As a condition precedent to moving the existing call to a conference, an authentication process may be performed to authenticate the participant initiating the request. In one approach, a web page is displayed (not shown in FIG. 2), whereby Bob may be required to provide a user identifier and password (or other type of identifying information which can be used for authentication) that can be used to ensure that the request to move the call is authentic (e.g., that the request originates from the party represented in the request). As noted earlier, an authorization process may also be performed to verify that Bob is authorized to request moving the call to a conference bridge. Known techniques for authentication and authorization are preferably used.

Responsive to receiving the move request (and authenticating and verifying authorization, as appropriate), the application servers realize the person requesting a conference is already connected to another party and retrieve information pertaining to the SIP session of the requesting party (i.e., Bob, in this example) as well as information pertaining to the SIP session of the other participant in the existing call. This retrieval is illustrated in FIG. 2 at reference numbers 109, 110. At reference number 109, the proxy server sends a retrieval request to an application server 161, and at reference number 110, the application server then retrieves the requested information from the database 170. The retrieved information is then returned in a response that preferably follows the reverse message path 110, 109. (It should be noted that the message flows shown at 109, 110 would typically pass through application server 160 instead of application server 161. FIG. 2 depicts application server 161 as performing the information retrieval 109, 110 to illustrate the ability to distribute processing among more than one of the application servers in the cluster.)

Upon retrieving session information pertaining to the existing call, a conferencing session is initiated on an available application server, which is application server 161 in the example of FIG. 2. In turn, the conferencing session creates a conference on an available media server. This conferencing session is also referred to herein as a conference bridge. As illustrated in the example of FIG. 2, a media servers cluster may contain a plurality of media servers 180, 181, and the conference bridge is depicted as being created on media server 181 (see reference number 111).

Once the conferencing session establishes the new conference in this manner, the conferencing session on application server 161 sends requests to the SIP sessions of the original parties that reside on application server 160. These requests are depicted at reference numbers 112 and 113, and provide information that enables the SIP sessions to join the new conference. In one embodiment, the asynchronous invocation API of Web Sphere Application Server is used at application server 160 for receiving the requests in message flows 112, 113. ("Web Sphere" is a registered trademark of International Business Machines Corporation in the United States, other countries, or both.)

Responsive to receiving the requests to join the newly-established conference, the application server 160 causes the SIP sessions of the original call participants to join the newly-established conference. See reference numbers 114, 115, which represent message flows from the SIP sessions on application server 160 to the conference on media server 181. In one embodiment, conventional SIP INVITE messages are used in these message flows 114, 115, and result in adding the original call participants (i.e., the sessions of Allen and Bob) to the conference. In turn, after the SIP sessions for the two participants have been added to the conference in media server 181, their SIP sessions at application server 160 send reINVITE messages to their corresponding telephones or devices. Reference numbers 116 and 117 show the reINVITE message sent from the SIP session for Allen, through the proxy server 150 and on to Allen's telephone. Similarly, reference number 118 and 119 show the reINVITE message sent from the SIP session for Bob, through the proxy server 150 and on to Bob's telephone. Note that the messages to Allen and Bob may be sent simultaneously. These reINVITE messages contain Session Description Protocol ("SDP") information that enables the original participants' telephones to be connected through the conference on the media server 181. Reference numbers 120a, 120b depict the resulting seamlessly-moved connection between Allen and Bob. The parties are now connected through the conference, without having to hang up their initial (i.e., already-established) call and without having to dial into a conference bridge. Additional participants may now call the conference bridge and connect into the conference using existing techniques.

The participant who requests the conferencing of the existing call may select other participants to be included in the conference call. This may be done in various ways. In one approach, a company directory or a personal address book is accessed, and entries from the directory or address book are displayed on a user interface from which the participant who requests the conference can then select one or more people to be added to, or to be invited to join, the conference. In another approach, the participant requesting the conferencing of the existing call may enter one or more telephone numbers of participants who are selected for adding to the conference. The other selected parties are then automatically called, and connected to the conference upon answering the call. A conference is therefore set up among all the original participants as well as one or more other participants.

FIG. 3 illustrates sample data structures which may be used for storing information used by an embodiment of the present invention, as will now be described. (As will be obvious, the data structures and contents thereof as shown in FIG. 3 are merely illustrative. Additional and/or different information may be provided without deviating from the scope of the present invention, and storage means other than tables in a database may be used without deviating from the scope of the present invention.)

An Active Calls table 300 stores information pertaining to active calls, such as the call 106 between Allen and Bob which was discussed above with reference to FIG. 1. (The information in Active Calls table 300, as well as the information in tables 320 and 340 which are discussed below, may be stored in the database 170 which was discussed above with reference to FIG. 2.) In this sample table 300, the stored information comprises a call index number 301, the telephone number of the calling party 302, and the telephone number of the called party 303. See row 310, which depicts a sample call index number of "1", a sample calling party number of "555-555-0001", and a sample called party number of "555-555-0002". The information in columns 302, 303 of table 300 may be stored responsive to message flows 103, 107 of FIG. 2 (and the information in column 301 is preferably generated as a unique index for identifying each row).

An Active Sessions table 320 stores information about currently-active sessions. In the sample table 320, the stored information comprises a session number 321, an application session identifier (hereinafter, "ID") 322, the phone number of the calling party 323, and a conference session identifier 324. Row 330 of the sample data depicts a session ID of "1", an application session ID of "app1.1234567890_12345", a calling party number of "555-555-0001", and a conference session ID of "app3.0987654321_32145". Row 331 of the sample data depicts a session ID of "2", an application session ID of "app2.15432167890_98876", a calling party number of "555-555-0002", and a conference session ID of "app3.0987654321_32145". The information in columns 322, 323 of table 320 may be stored responsive to message flow 107 of FIG. 2 (and the information in column 321 is preferably generated as a unique index for identifying each row), where each SIP session has a separate row in the table. Row 330 may therefore represent the SIP session of Allen, while row 331 represents the SIP session of Bob.

The information in column 324 may be empty (or a nil value) while the parties are participating in a conventional, non-conference call, and an actual session ID may then be inserted into column 324 when a conference is established for moving that call (such as the conference discussed above with regard to reference number 111 of FIG. 2). Accordingly, both of rows 330 and 331 use the same conference session ID value in column 324, indicating that the application sessions represented by these 2 rows are participating in the same conference.

A Conferences table 340 stores information about currently-active conferences. In the sample table 340, the stored information comprises a conference number 341, a conference session ID 342, and a list 343 comprising the application session ID of each participant in that conference. Row 350 of the sample data depicts a conference number of "9", a conference session ID of "app3.0987654321_32145", and a list with application session IDs "app1.1234567890_12345" and "app2.15432167890_98876". Note that the entries in table 340 are related to the entries in table 320. As one example, the conference session ID values from column 324 of table 320 may used as pointers, or references, to values found in column 342 of table 340. As another example, the conference participant session IDs in the list in column 343 of table 340 may be used as pointers, or references, to entries in column 322 of table 320. Thus, in the sample tables, row 350 indicates that a conference session having conference session ID "app3.0987654321_32145" (column 342) exists and that the current participants in this conference use the application sessions "app1.1234567890_12345" and "app2.15432167890_98876" (column 343). These application session IDs from the list in column 343 of table 340 can be used as pointers to column 322 of table 320 in order to locate the phone number for the calling party (from column 323) of the respective participant sessions. The information in columns 342, 343 of table 340 may be stored responsive to message flows 112, 113 of FIG. 2 (and the information in column 341 is preferably generated as a unique index for identifying each row). As additional participants join the conference, a row to represent a new application session for each such additional participant is added to table 320 and a corresponding entry is added to the list of application session IDs in column 343 of table 340.

Figure 4:
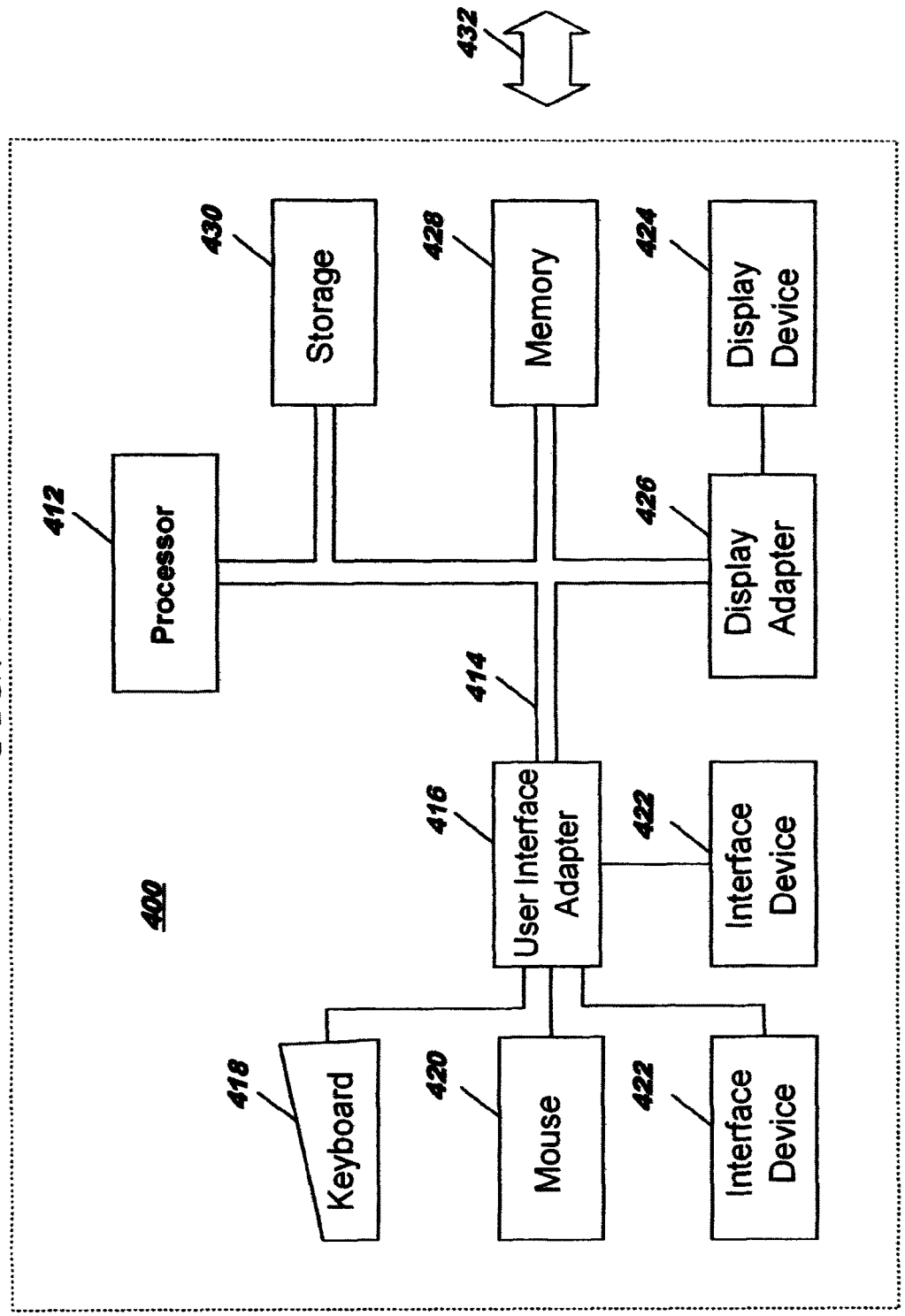
FIG. 4 depicts a data processing system suitable for storing and/or executing program code.

Referring now to FIG. 4, a data processing system 400 suitable for storing and/or executing program code includes at least one processor 412 coupled directly or indirectly to memory elements through a system bus 414. The memory elements can include local memory 428 employed during actual execution of the program code, bulk storage 430, and cache memories (not shown) which provide temporary storage of at least some program code in order to reduce the number of times code must be retrieved from bulk storage during execution.

Input/output ("I/O") devices (including but not limited to keyboards 418, displays 424, pointing devices 420, other interface devices 422, etc.) can be coupled to the system either directly or through intervening I/O controllers or adapters (416, 426).

Network adapters may also be coupled to the system to enable the data processing system to become coupled to other data processing systems or remote printers or storage devices through intervening private or public networks (as shown generally at 432). Modems, cable modem attachments, wireless adapters, and Ethernet cards are just a few of the currently-available types of network adapters.

Figure 5:
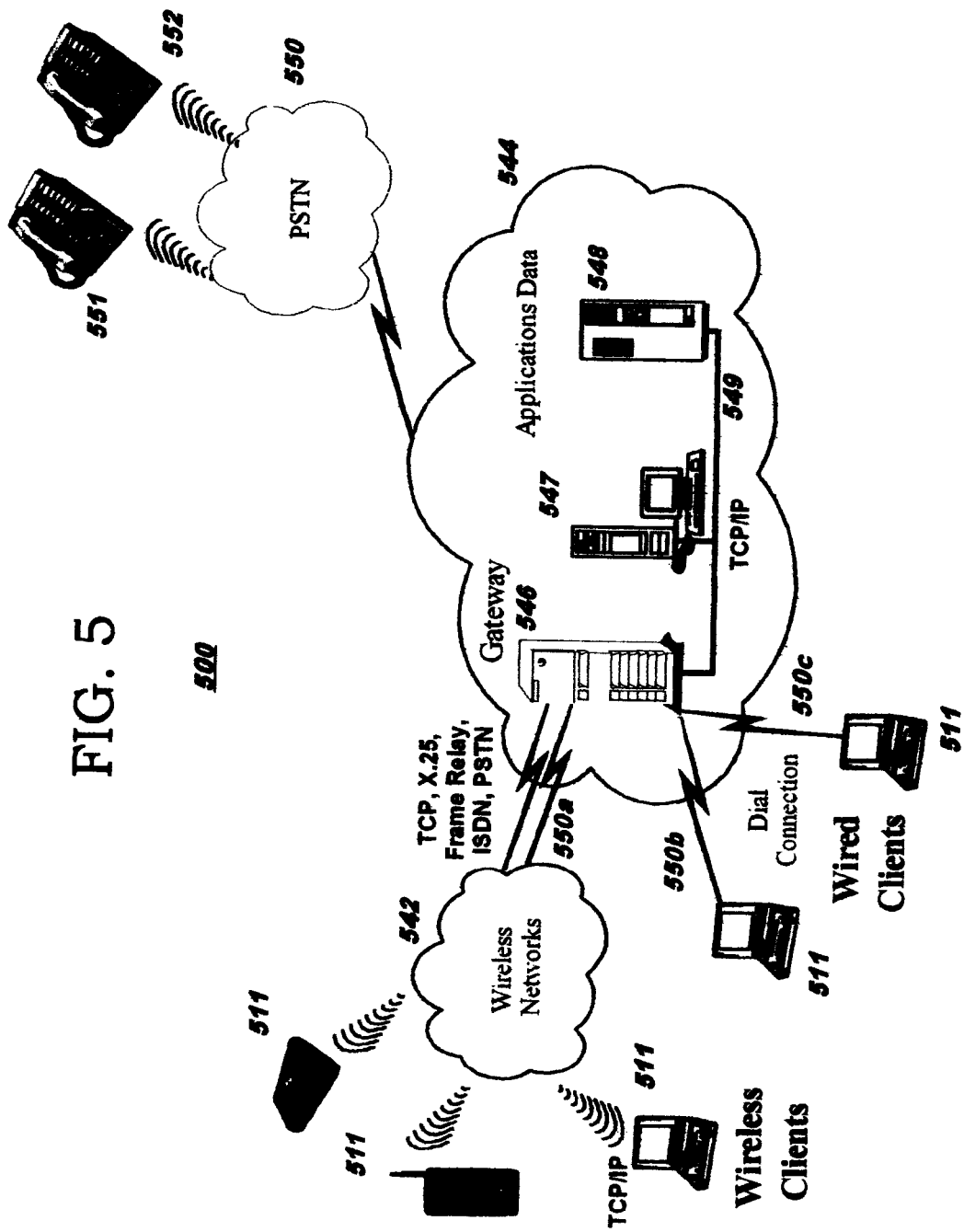
FIG. 5 depicts a representative networking environment in which one or more embodiments of the present invention may be used.

FIG. 5 illustrates a data processing network environment 500 in which the present invention may be practiced. The data processing network 500 may include a plurality of individual networks, such as wireless network 542 and wired network 544. A plurality of wireless devices 510 may communicate over wireless network 542, and a plurality of wired devices, shown in the figure (by way of illustration) as workstations 511, may communicate over network 544. Additionally, as those skilled in the art will appreciate, one or more local area networks ("LANs") may be included (not shown), where a LAN may comprise a plurality of devices coupled to a host processor. A public switched telephone network ("PSTN") 550 may be connected to wired network 544, and a plurality of telephones 551, 552 may be connected to the PSTN 550.

Still referring to FIG. 5, the networks 542 and 544 may also include mainframe computers or servers, such as a gateway computer 546 or application server 547 (which may access a data repository 548). A gateway computer 546 serves as a point of entry into each network, such as network 544. The gateway 546 may be preferably coupled to another network 542 by means of a communications link 550a. The gateway 546 may also be directly coupled to one or more workstations 511 using a communications link 550b, 550c, and/or may be indirectly coupled to such devices. The gateway computer 546 may be implemented utilizing an Enterprise Systems Architecture/390® computer available from IBM. Depending on the application, a midrange computer, such as an iSeries®, System i™, and so forth may be employed. ("Enterprise Systems Architecture/390" and "iSeries" are registered trademarks of IBM in the United States, other countries, or both, and "System i" is a trademark of IBM.)

The gateway computer 546 may also be coupled 549 to a storage device (such as data repository 548).

Those skilled in the art will appreciate that the gateway computer 546 may be located a great geographic distance from the network 542, and similarly, the workstations 511 may be located some distance from the networks 542 and 544, respectively. For example, the network 542 may be located in California, while the gateway 546 may be located in Texas, and one or more of the workstations 511 may be located in Florida. The workstations 511 may connect to the wireless network 542 using a networking protocol such as the Transmission Control Protocol/Internet Protocol ("TCP/IP") over a number of alternative connection media, such as cellular phone, radio frequency networks, satellite networks, etc. The wireless network 542 preferably connects to the gateway 546 using a network connection 550a such as TCP or User Datagram Protocol ("UDP") over IP, X.25, Frame Relay, Integrated Services Digital Network ("ISDN"), Public Switched Telephone Network ("PSTN"), etc. The workstations 511 may connect directly to the gateway 546 using dial connections 550b or 550c. Further, the wireless network 542 and network 544 may connect to one or more other networks (not shown), in an analogous manner to that depicted in FIG. 5.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computing device through any type of network, including a local area network ("LAN") or a wide area network ("WAN"), or the connection may be made to an external computer (for example, through the Internet using an Internet Service Provider).

Aspects of the present invention are described above with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Flowcharts and block diagrams in the figures herein illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or each flowchart illustration, and combinations of blocks in the block diagrams and/or flowchart illustration, can be implemented by special purpose hardware-based systems that perform the specified functions or acts, or combinations of special purpose hardware and computer instructions.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A system for seamlessly conferencing a telephone call, comprising:
   a computer comprising a processor; and
   instructions which are executable, using the processor, to implement functions comprising:
      establishing a telephone call connecting a first party and a second party, comprising creating a first session for the first party and a second session for the second party, the telephone call being a 2-party telephone call that is distinct from a conference call;
      storing, for the telephone call, first session information describing the first session and second session information describing the second session, the first session information comprising a first phone number in use by the first party for the telephone call and a session identifier of the first session and the second session information comprising a second phone number in use by the second party for the telephone call and a session identifier of the second session;
      receiving, while the telephone call continues to connect the first party and the second party, a request from the first party to create a conference call for adding a third party in communication with the first party and the second party;
      determining, responsive to the receiving, that an active call record exists in which the first phone number and the second phone number are both specified, and thus concluding that the first party is already connected to the second party in the existing connected telephone call; and
      non-disruptively establishing the requested conference call by moving the existing first session and the existing second session from the connected telephone call to a media server that provides the requested conference call, responsive to the concluding, without terminating the existing connected telephone call and without requiring acceptance of the conference call by the first party or the second party, further comprising:
         retrieving the stored first and second session information;
         generating a conference session identifier to represent the conference call;
         generating a conference record and storing therein the conference session identifier, a link to the stored first session information, and a link to the stored second session information; and updating the stored first session information and the stored second session information to include therein the conference session identifier.

2. The system according to claim 1, wherein the non-disruptively establishing further comprises:

establishing a conference session for the requested conference call;

establishing the requested conference call on the media server;

requesting the first session and the second session to join the established conference call;

responsive to receiving the request to join the established conference call, sending invitation messages for the first session and for the second session to join the conference session, thereby causing the first session and the second session to join the conference call;

responsive to the joining, automatically sending, for the respective first session and second session, re-invitation messages to a first user agent used by the first party for the existing connected telephone call and a second user agent used by the second party for the existing connected telephone call, the re-invitation messages containing information that enables the first user agent and the second user agent to connect to the conference call at the media server, thereby automatically causing the first party and the second party to join as participants in the conference call without requiring action by the first party or the second party; and initiating a telephone call to a phone number of the third party, and upon detecting that the third party answers the initiated telephone call, automatically joining a third session to the conference session for the third party to participate in the conference call and automatically connecting a third user agent, used by the third party to answer the initiated telephone call, to the conference call.

3. The system according to claim 2, wherein:

the first, second, and third sessions are Session Initiation Protocol ("SIP") sessions;

the invitation messages are SIP INVITE messages; and the re-invitation messages are SIP reINVITE messages.

4. The system according to claim 2, wherein:

responsive to receiving the re-invitation message at the first user agent, the first user agent automatically connects to the conference call without requiring action by the first party; and responsive to receiving the re-invitation message at the second user agent, the second user agent automatically connects to the conference call without requiring action by the second party.

5. The system according to claim 1, wherein the request is signaled by entry of a key sequence.

6. The system according to claim 1, wherein the non-disruptively establishing is performed responsive to authenticating identifying information of the first party and verifying that the first party is authorized to make the request.

7. A computer program product for seamlessly conferencing a telephone call, the computer program product comprising:

a computer readable storage medium having computer readable program code embodied therein, the computer readable program code configured for:

establishing a telephone call connecting a first party and a second party, comprising creating a first session for the first party and a second session for the second party, the telephone call being a 2-party telephone call that is distinct from a conference call;

storing, for the telephone call, first session information describing the first session and second session information describing the second session, the first session information comprising a first phone number in use by the first party for the telephone call and a session identifier of the first session and the second session information comprising a second phone number in use by the second party for the telephone call and a session identifier of the second session;

receiving, while the telephone call continues to connect the first party and the second party, a request from the first party to create a conference call for adding a third party in communication with the first party and the second party;

determining, responsive to the receiving, that an active call record exists in which the first phone number and the second phone number are both specified, and thus concluding that the first party is already connected to the second party in the existing connected telephone call; and non-disruptively establishing the requested conference call by moving the existing first session and the existing second session from the connected telephone call to a media server that provides the requested conference call, responsive to the concluding, without terminating the existing connected telephone call and without requiring acceptance of the conference call by the first party or the second party, further comprising:

retrieving the stored first and second session information;

generating a conference session identifier to represent the conference call;

generating a conference record and storing therein the conference session identifier, a link to the stored first session information, and a link to the stored second session information; and updating the stored first session information and the stored second session information to include therein the conference session identifier.

8. The computer program product according to claim 7, wherein the non-disruptively establishing further comprises:

establishing a conference session for the requested conference call;

establishing the requested conference call on the media server;

requesting the first session and the second session to join the established conference call;

responsive to receiving the request to join the established conference call, sending invitation messages for the first session and for the second session to join the conference session, thereby causing the first session and the second session to join the conference call;

responsive to the joining, automatically sending, for the respective first session and second session, re-invitation messages to a first user agent used by the first party for the existing connected telephone call and a second user agent used by the second party for the existing connected telephone call, the re-invitation messages containing information that enables the first user agent and the second user agent to connect to the conference call at the media server, thereby automatically causing the first party and the second party to join as participants in the conference call without requiring action by the first party or the second party; and initiating a telephone call to a phone number of the third party, and upon detecting that the third party answers the initiated telephone call, automatically joining a third session to the conference session for the third party to participate in the conference call and automatically connecting a third user agent, used by the third party to answer the initiated telephone call, to the conference call.

9. The computer program product according to claim 8, wherein:
the first, second, and third sessions are Session Initiation Protocol ("SIP") sessions;
the invitation messages are SIP INVITE messages; and
the re-invitation messages are SIP reINVITE messages.

10. The computer program product according to claim 7, wherein the request is signaled by entry of a request indicator on an application interface.

* * * * *